(12) United States Patent
Ichida

(10) Patent No.: US 10,723,318 B2
(45) Date of Patent: Jul. 28, 2020

(54) WINDOW GLASS FOR A VEHICLE

(71) Applicant: AGC Inc., Chiyoda-ku (JP)

(72) Inventor: Kouichi Ichida, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 303 days.

(21) Appl. No.: 15/837,567

(22) Filed: Dec. 11, 2017

(65) Prior Publication Data

US 2018/0176996 A1      Jun. 21, 2018

(30) Foreign Application Priority Data

Dec. 20, 2016 (JP) ................. 2016-246441

(51) Int. Cl.
| | |
|---|---|
| *B60S 1/04* | (2006.01) |
| *H05B 3/84* | (2006.01) |
| *B60S 1/02* | (2006.01) |
| *B60J 10/70* | (2016.01) |
| *B32B 17/10* | (2006.01) |
| *H05B 3/86* | (2006.01) |
| *B60J 1/00* | (2006.01) |

(52) U.S. Cl.
CPC ........ *B60S 1/048* (2013.01); *B32B 17/10036* (2013.01); *B32B 17/10385* (2013.01); *B32B 17/10761* (2013.01); *B60J 10/70* (2016.02); *B60S 1/026* (2013.01); *B60S 1/04* (2013.01); *H05B 3/84* (2013.01); *H05B 3/86* (2013.01); *B60J 1/001* (2013.01)

(58) Field of Classification Search
CPC ...... H05B 2203/031; H05B 3/84; H05B 3/86; H05B 3/0014; H05B 3/06; H05B 1/0236; B32B 17/10385; B32B 17/10036; B32B 17/10761; B60J 10/70; B60J 10/79; B60S 1/026; B60S 1/04; B60S 1/048; B60S 1/0477
USPC ....................................... 219/203
See application file for complete search history.

(56) References Cited

U.S. PATENT DOCUMENTS

| | | | | |
|---|---|---|---|---|
| 2,030,117 A | * | 2/1936 | Page ............... | H05B 3/84 |
| | | | | 219/203 |
| 2,557,905 A | * | 6/1951 | Burton ............ | H05B 1/0236 |
| | | | | 219/213 |

(Continued)

FOREIGN PATENT DOCUMENTS

| | | |
|---|---|---|
| EP | 0 788 295 A2 | 8/1997 |
| EP | 0 788 295 A3 | 8/1997 |

(Continued)

*Primary Examiner* — Patrick M. Buechner
(74) *Attorney, Agent, or Firm* — Oblon, McClelland, Maier & Neustadt, L.L.P.

(57) ABSTRACT

A window glass for a vehicle including a laminated glass with a vehicle exterior side glass plate, a vehicle interior side glass plate and an interlayer interposed between the vehicle exterior side glass plate and the vehicle interior side glass plate. The window glass also having a conductor pattern including a heating wire disposed on a vehicle interior side surface of the vehicle exterior side glass plate to heat a heating area, as well as a feeding electrode disposed on a part of the vehicle interior side surface close to a lower side of the vehicle exterior side glass plate such that the heating wire is fed with power through the feeding electrode. The feeding electrode is disposed so as not to extend into the heating area.

12 Claims, 3 Drawing Sheets

(56) References Cited

U.S. PATENT DOCUMENTS

| | | | | |
|---|---|---|---|---|
| 3,721,594 A * | 3/1973 | Tarnopol | B32B 17/10055 | 156/89.17 |
| 3,757,087 A * | 9/1973 | Bernard | H01R 4/02 | 219/549 |
| 3,790,745 A * | 2/1974 | Levin | B32B 17/10036 | 219/203 |
| 3,792,232 A * | 2/1974 | Zarenko | B32B 17/10036 | 219/522 |
| 3,794,809 A * | 2/1974 | Beck | B32B 17/10 | 219/203 |
| 3,895,218 A * | 7/1975 | Cooke | H05B 3/06 | 219/543 |
| 3,995,142 A * | 11/1976 | Ciardelli | B60S 1/586 | 219/522 |
| 4,109,133 A * | 8/1978 | Hanle | B60S 1/583 | 15/250.05 |
| 4,388,522 A * | 6/1983 | Boaz | H05B 3/84 | 219/203 |
| 4,543,466 A * | 9/1985 | Ramus | B32B 17/10036 | 219/203 |
| 4,820,902 A * | 4/1989 | Gillery | B32B 17/10036 | 219/203 |
| 4,994,650 A * | 2/1991 | Koontz | B32B 17/10036 | 219/497 |
| 5,089,687 A * | 2/1992 | Bartrug | B32B 17/10036 | 219/203 |
| 5,213,828 A | 5/1993 | Winter et al. | | |
| 5,824,993 A * | 10/1998 | Chrysochoos | B32B 17/10036 | 219/203 |
| 6,163,013 A * | 12/2000 | King | H05B 3/84 | 219/203 |
| 8,921,739 B2 * | 12/2014 | Petrenko | H05B 3/84 | 219/203 |
| 9,302,451 B2 * | 4/2016 | Lisinski | B32B 17/10174 | |
| 2003/0042239 A1 * | 3/2003 | Sol | B32B 17/10036 | 219/203 |
| 2003/0057197 A1 * | 3/2003 | Schmidt | B60S 1/026 | 219/203 |
| 2004/0084432 A1 * | 5/2004 | Schwartz | B60S 1/048 | 219/203 |
| 2005/0089691 A1 * | 4/2005 | Noguchi | B32B 17/10807 | 428/426 |
| 2009/0277671 A1 * | 11/2009 | Hahn | B32B 17/10036 | 174/257 |
| 2014/0332519 A1 | 11/2014 | Sakamoto et al. | | |
| 2014/0374401 A1 * | 12/2014 | Nakagawa | H05B 3/86 | 219/203 |
| 2017/0339750 A1 * | 11/2017 | Schall | H05B 3/84 | |
| 2018/0014362 A1 * | 1/2018 | Bulgajewski | B60S 1/048 | |
| 2018/0098386 A1 * | 4/2018 | Masschelein | H05B 3/84 | |

FOREIGN PATENT DOCUMENTS

| | | |
|---|---|---|
| EP | 0 800 333 A2 | 10/1997 |
| EP | 0 800 333 A3 | 10/1997 |
| EP | 0 849 977 A2 | 6/1998 |
| EP | 0 849 977 A3 | 6/1998 |
| JP | 3317635 | 8/2002 |
| JP | 2012-140086 | 7/2012 |
| JP | 5585440 | 9/2014 |
| WO | WO 2013/050233 A1 | 4/2013 |
| WO | WO 2016/125403 A1 | 8/2016 |

* cited by examiner

WINDOW GLASS FOR A VEHICLE

TECHNICAL FIELD

The present invention relates to window glass for a vehicle, in particular, window glass for a vehicle, which is equipped with a feeding structure for feeding power from a feeding electrode to a heating wire disposed at a heating area in a surface of a glass plate in order to melt frost, snow, ice or the like adhering to the window glass.

BACKGROUND ART

As disclosed in e.g. JP Patent No. 3317635, there has been known window glass for a vehicle, which is equipped with a heater to melt frost, snow, ice or the like adhering to a glass plate. The heater includes a conductor pattern made of conductors disposed on a glass plate forming a part of window glass for a vehicle, and the conductor pattern includes heating wires disposed at a heating area in a surface of the glass plate, and a feeding electrode connected to the heating wires. The heating area includes a first heating area positioned to extend along a lower side of the glass plate so as to correspond to a standby position where a wiper is normally located during standby, and a second heating area positioned to extend along a lateral side of the glass plate so as to correspond to a moving direction reversing position where the wiper reverses its moving direction during operation such that the first and second heating areas are positioned in a plurality of different areas on the surface of the glass plate. The heating wire includes a first heating wire disposed so as to correspond to the first heating area, and a second heating wire disposed so as to correspond to the second heating area. The feeding electrode includes a positive electrode with a dc voltage (e.g. 12 V) applied thereto, and a negative electrode connected to the body of the vehicle. The electrodes are connected to a dc source disposed in the vehicle and the body through wiring cables (in a wire-harness).

DISCLOSURE OF INVENTION

Technical Problem

The window glass for a vehicle, which is disclosed as being equipped with a heater by the above-identified prior art reference, has a feeding electrode disposed to extend from a lower side edge of a glass plate toward an upper side thereof. The window glass is configured to have heating wires extending from upper parts of lateral sides toward a transverse direction such that the feeding electrode extends into a hearing area which is disposed to extend along a lower side of a glass plate so as to correspond to a standby position where a wiper is normally located during standby.

The feeding electrode has a large area enough to make heating wires generated heat in a sufficient way since the heating wires are fed with a comparatively large power to melt frost, snow, ice or the like adhering to the window glass. When the feeding electrode extends into a hearing area which is disposed to extend along a lower side of the glass plate so as to correspond to a standby position where a wiper is normally located during standby, the feeding electrode does not generate heat in an amount enough to melt frost, snow, ice or the like adhering to the glass plate, resulting in a problem where the frost, snow, ice or the like adhering to the glass plate is not sufficiently melted in a portion of the heating area where the feeding electrode extends into.

It is an object of the present invention to provide a solution to solve the above-mentioned problem.

Solution to Problem

In order to attain the object, the present invention provides window glass for a vehicle, including:

laminated glass including a vehicle exterior side glass plate, a vehicle interior side glass plate and an interlayer interposed between the vehicle exterior side glass plate and the vehicle interior side glass plate; and a conductor pattern including a heating wire disposed on a vehicle interior side surface of the vehicle exterior side glass plate to heat a heating area, and a feeding electrode disposed on a part of the vehicle interior side surface close to a lower side of the vehicle exterior side glass plate such that the heating wire is fed with power through the feeding electrode; wherein the feeding electrode is disposed so as not to extend into the heating area.

Advantageous Effects of Invention

The present invention provides window glass for a vehicle, which generates heat in an amount enough to melt frost, snow, ice or the like adhering to a glass plate, in a heating area disposed in laminated glass.

DESCRIPTION OF EMBODIMENTS

Now, the present invention will be described in detail, in reference to an embodiment shown as a non-limiting example in the accompanying drawings. It should be noted that the elements described with respect to the embodiment are examples, and that the spirit and scope of the present invention should not be limited to these elements.

The window glass for a vehicle, to which the present invention is applied, may be, for example, a windshield, a sliding window, a fix sash window or a rear windshield.

Figure 2:
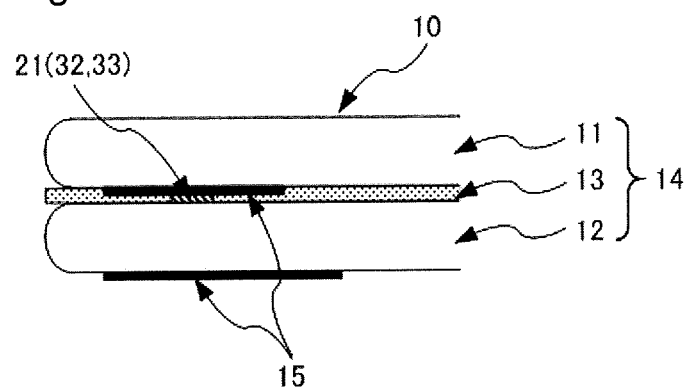
FIG. 2 is a cross-sectional view of a lower side area of the window glass according to the embodiment.

As shown in FIG. 2, the window glass for a vehicle 10 according to the embodiment is laminated glass 14 which includes a vehicle exterior side glass plate 11, a vehicle interior side glass plate 12 and an interlayer 13 interposed between the vehicle exterior side glass plate 11 and the vehicle interior side glass plate 12 and made of e.g. a polyvinyl butyral resin.

The laminated glass 14 has an opaque shielding layer (dark ceramic layers) 15 in a dark color (black) disposed in a belt pattern along the entire periphery of a peripheral area of each of the glass plates. Although the shielding layer 15 is shown to be disposed on each of a vehicle interior side surface of the vehicle exterior side glass plate 11 and a vehicle interior side surface of the vehicle interior side glass plate 12 in FIG. 2 as an example, the shielding layer may be disposed only on the vehicle interior side surface of the vehicle exterior side glass plate 11. The shielding layer 15 has such a function that a sealant, such as a urethane sealant, to be used for bonding and holding the laminated glass 14 to the body of a vehicle is protected from deterioration by ultraviolet light. The shielding layer 15 is disposed by applying ceramic paste on the vehicle interior side surface of the vehicle exterior side glass plate 11 and/or the vehicle interior side glass plate 12, followed by baking the applied paste. A part of the shielding layer 15 close to a lower side of the laminated glass has a width of about 50 mm to about 100 mm, and a part of the shielding layer 15 close to a lateral side of the laminated glass has a width of about 20 mm to about 40 mm.

A vehicle, to which the laminated glass 14 is mounted, includes a wiper to wipe an exterior side surface of the laminated glass 14. The wiper includes a first wiper and a second wiper (both being not shown) such that the first wiper moves between a state positioned in substantially parallel to the lower side of the laminated glass 14 (first wiper standby position 41*a*) and a state positioned at substantially the center of the laminated glass 14 (first wiper moving direction reversing position). The second wiper moves between a state positioned in substantially parallel to the lower side of the laminated glass 14 (second wiper standby position 41*b*) and a state positioned substantially in parallel to a lateral side of the laminated glass 14 (second wiper moving direction reversing position 41*c*). In the case of a right-hand drive vehicle, the first wiper standby position 41*a* is positioned on a front passenger seat side while the second wiper standby position 41*b* is positioned on a driver seat side. The first wiper and the second wiper are capable of wiping frost, snow, ice or the like adhering to the exterior side surface of the laminated glass 14 and have such a function that the frost, snow, ice or the like wiped by the wipers during movement is pushed away toward the lower side and the lateral side on the driver seat side of the laminated glass.

Figure 1:
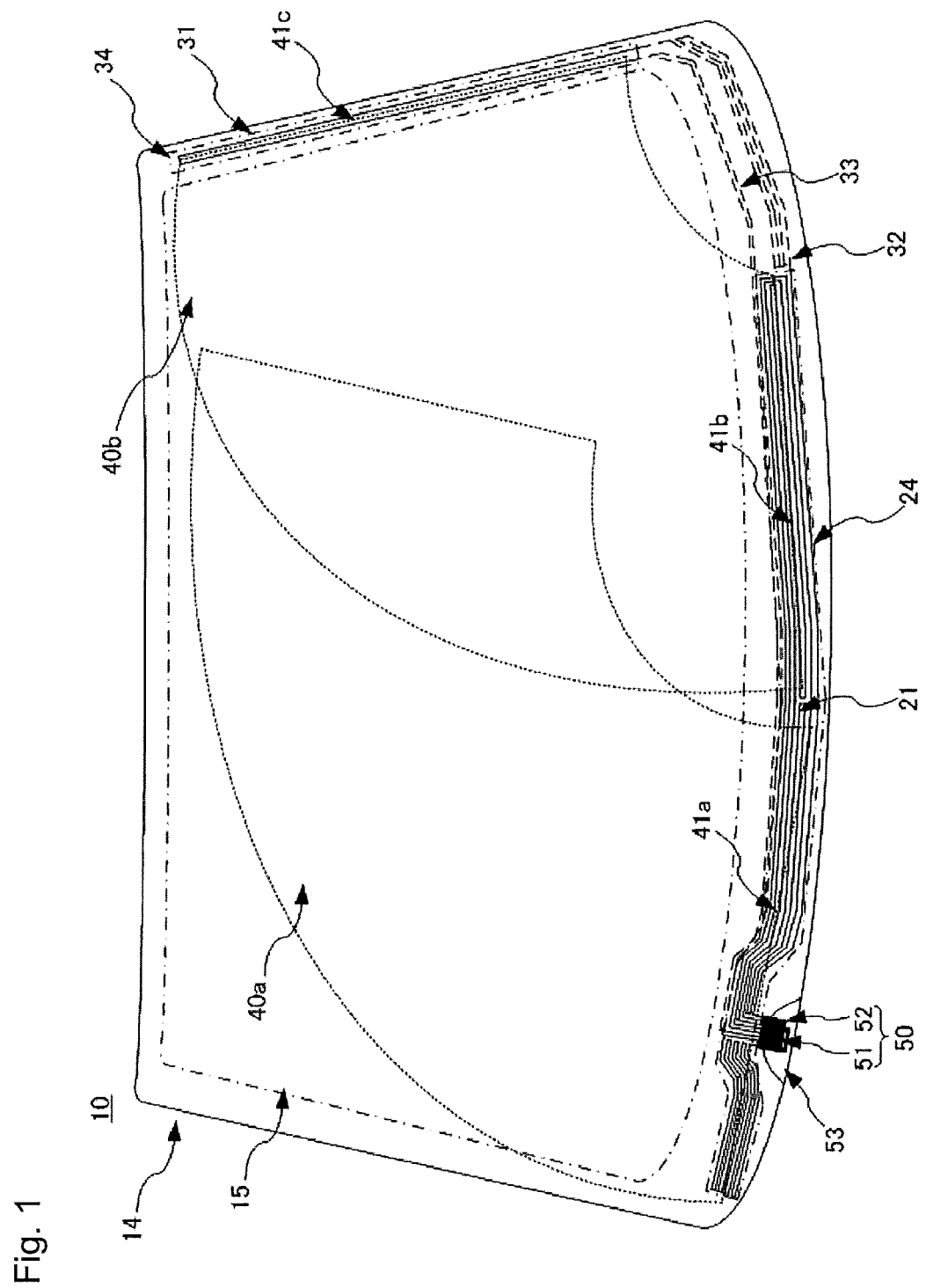
FIG. 1 is a front view of the window glass for a vehicle equipped with a feeding structure according to an embodiment of the present invention, seen from a vehicle exterior side thereof.

The laminated glass 14 has a heating area disposed on a surface thereof to generate heat by heating wires. The heating area is positioned on each of a plurality of heating areas on the surface of the laminated glass 14. Specifically, the heating areas includes a lower side heating area 24 and a lateral side heating area 34 as shown in FIG. 1. In the case of a right-hand drive vehicle, the lower side heating area 24 is disposed in an area corresponding to the first wiper standby position 41*a* in the vicinity of the lower side of the laminated glass 14 in a first wiper wiping range 40*a* on the front passenger seat side and the second wiper standby position 41*b* in the vicinity of the lower side of the laminated glass 14 in a second wiper wiping range 41*b* on the driver seat side. The lateral side heating area 34 is disposed in an area corresponding to the second wiper moving direction reversing position 41*c* in the vicinity of the lateral side of the laminated glass 14 in a second wiper wiping range 40*b*. The number of the wiping ranges is determined depending on the number of wipers to be mounted to a vehicle. Although it is shown in FIG. 1 that the wiping ranges are located at two positioned, the number may be one or at least three.

The vehicle exterior side glass plate 11 has a conductor pattern made of conductors disposed on the vehicle interior side surface. The conductor pattern may be disposed by printing or applying, e.g. conductive silver paste (material having a resistivity of $0.5 \times 10^{-8} \Omega \cdot m$ to $9.0 \times 10^{-8} \Omega \cdot m$) on the vehicle interior side surface of the vehicle exterior side glass plate 11, followed by baking the applied paste. The conductor pattern includes heating wires 21 and 31 for heating the heating areas 24 and 34, and a feeding electrode 50 for connection with the heating wires 21 and 31. The heating wires 21 and 31 are fed with power from the feeding electrode 50 to generate heat to function as a deicer to melt frost, snow, ice or the like adhering to the laminated plate 14.

The heating wires 21 and 31 are disposed so as to correspond to the heating areas 24 and 34 respectively, and include a lower side heating wire 21 corresponding to the lower side heating area 24 and a lateral side heating wire 31 corresponding to the lateral side heating area 34. Each of the lower side heating wire 21 and the lateral side heating wire 31 is fed with power to generate heat so as to melt frost, snow, ice or the like adhering to the laminated plate 14 by the generated heat.

The conductor pattern is disposed so as to be interposed between the vehicle exterior side glass plate 11 and the vehicle interior side glass plate 12. The conductor pattern is disposed on the vehicle interior side surface of the vehicle exterior side glass plate 11 in an overlapping range with the shielding layer 15 so as not to be seen from a vehicle exterior side. Specifically, the conductor pattern is disposed on a surface layer of the shielding layer 15 disposed on the vehicle interior side of the vehicle exterior side glass plate 11, and is interposed by the interlayer 13 and the vehicle exterior side glass plate 11. The shielding layer 15 has a function of achieving an improved design property such that the lower side heating wire 21, the lateral side heating wire 31, a first wire for the lateral side heating wire 32, a second wire for the lateral side heating wire 33, and a positive electrode 51 and a negative electrode 52 of the feeding electrode 50 are prevented from being seen from a vehicle exterior side.

The laminated glass 14 has an arc-like cutout portion 53 formed in a part of a lower side of the vehicle interior side glass plate 12. The positive electrode 51 and the negative electrode 52 of the feeding electrode 50 are disposed so as to be apart with a slight distance therebetween in a position corresponding to the cutout portion formed in the vehicle interior side. The positive electrode 51 and the negative electrode 52 of the feeding electrode 50 are disposed on the vehicle interior side of the vehicle exterior side glass plate 11, and are exposed in the cutout portion 53.

The positive electrode 51 and the negative electrode 52 of the feeding electrode 50 are connected to wiring cables (in a wire-harness) through soldered terminals. The feeding electrode 50 has a function of feeding an electric current to the heating wires from the wiring cables.

The connection of the positive electrode 51 and the negative electrode 52 to the wiring cables are made at the cutout portion 53. A sealant made of silicone or a polyurethane polymer is disposed in a connection part where the positive electrode 51 and the negative electrode 52 are connected to the wiring cables, in order to seal the connection part. The positive electrode 51 is an electrode to be applied with a dc voltage (e.g. 12 V) from a dc source disposed in the vehicle through a wiring cable, and the negative electrode 52 is an electrode connected to the body of the vehicle through a wiring cable.

The positive electrode 51 and the negative electrode 52 are connected to the lower side heating wire 21 and the lateral side heating wire 31.

The lower side heating wire 21 includes a plurality of heating wires in the vicinity of the lower side of the laminated glass 14 (the lower side heating area 24 corresponding to the standby position where the first wiper is normally located during standby) extending substantially in parallel to each other along the lower side of the laminated glass 14. Specifically, the lower side heating wire is disposed in a pattern to be connected to the positive electrode 51 of the feeding electrode 50, extend along the lower side of the laminated glass 14, turn back in the vicinity at a left end and/or right end in a width direction of the lower side heating wire 24, and return to the negative electrode 52.

The lateral side heating wire 31 is disposed in a position close to the lateral side of the laminated glass 14 (in the lateral side heating area 34 corresponding to the second wiper moving direction reversing position) and is connected to the first wire for the lateral side heating wire 32 and the second wire for the lateral side heating wire 33, which extend along the lower side of the laminated glass 14. Specifically, the second wire for the lateral side heating wire 33 has one end connected to the positive electrode 51 of the feeding electrode 50, and the lateral side heating wire 31 has one end connected to a part of the second wire for the lateral side heating wire 33 in the vicinity of the other end of the second wire for the lateral side heating wire 33 out of connection to the positive electrode 51. The lateral side heating wire 31 is disposed in such a pattern that the lateral side heating wire extends along the lateral side of the laminated glass 14 (i.e. a side pillar) and turns back in the vicinity of an upper end of the lateral side heating area 34, and the other end of the lateral side heating wire 31 out of connection with the second wire for the lateral heating wire 33 is connected to a part of the first wire for the lateral heating wire 32 in the vicinity of an end of the first wire for the lateral side heating wire 32, and the other end of the first wire for the lateral side heating wire 32 out of connection with the lateral side heating wire 31 is connected to the negative electrode 52. Alternatively, the second wire for the lateral side heating wire 33 may be connected to the negative electrode 52. In the alternative case, the first wire for the lateral side heating wire 32 is connected to the positive electrode 51.

Figure 3:
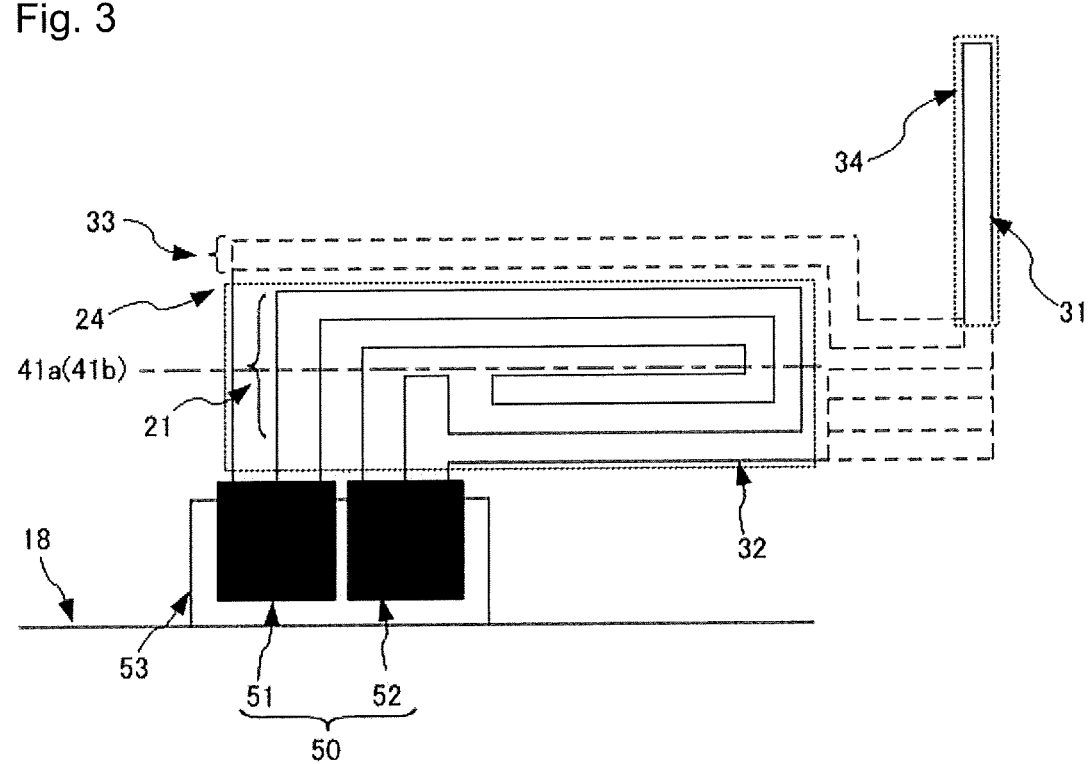
FIG. 3 is a schematic view of a conductor pattern of the window glass according to the embodiment.

FIG. 3 is a schematic diagram showing the conductor pattern of the window glass for a vehicle according to this embodiment. As shown in FIG. 3, the conductor pattern of the window glass for a vehicle according to this embodiment is configured such that the lower side heating wire 21, the first wire for the lateral heating wire 32 and the second wire for the lateral side heating wire 33 extend toward an upper side of the laminated glass 14. The first wire for the lateral heating wire 32 is disposed between the lower side heating wire 21 and a lower side edge 18 of the vehicle exterior side glass plate 11 in order to feed an electric current to the lateral side heating wire 31 corresponding to the lateral side heating area 34. The second wire for the lateral side heating wire 33 is disposed on the vehicle exterior side glass plate 11 at a position closer to the upper side than the lower side heating wire 21.

Figure 4:
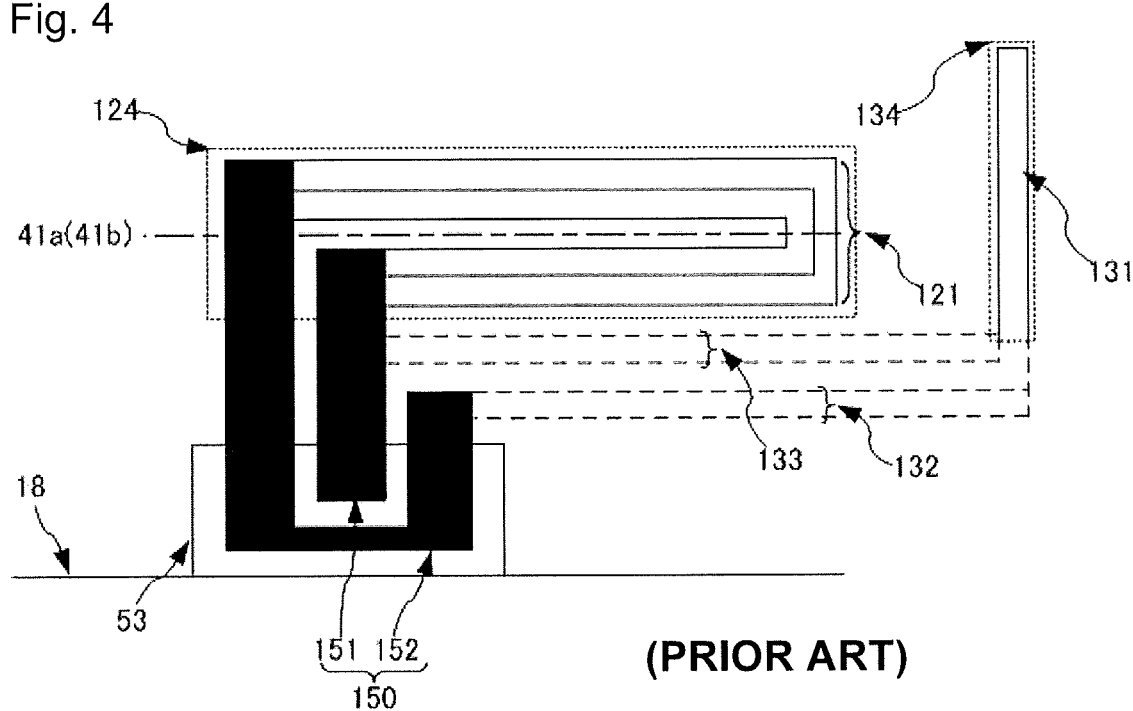
FIG. 4 is a schematic view of a conventional conductor pattern for vehicle window glass.

FIG. 4 is a schematic view of a conventional conductor pattern for a vehicle window. As shown in FIG. 4, the conventional feeding electrode 150 has a positive electrode 151 and a negative electrode 152 disposed so as to extend from a lower side edge 18 of a vehicle exterior side glass plate 11 toward an upper side of the vehicle exterior side glass plate 11 and to extend into a lower side heating area 124. Although the feeding electrode 150 has a comparatively large area enough to sufficiently generate heat in the lower side heating area 124, the feeding electrode 150 per se does not sufficiently generate heat for the purpose of melting frost, snow, ice or the like adhering to the laminated plate. As a result, the frost, snow, ice or the like adhering to the laminated plate fails to be sufficiently melted in an area where the feeding electrode 150 extends into the lower side heating area 124. This causes a problem in that the frost, snow, ice or the like in an unmelted state hinders a driver's field of view, and that the movement of a wiper is adversely affected.

In contrast, as shown in FIG. 3, the conductor pattern of the window glass for a vehicle according to the embodiment is configured such that the lower side heating wire 21, the first wire for the lateral side heating wire 32 and the second wire for the lateral side heating wire 33 extend from the feeding electrode 50 toward the upper side of the vehicle exterior side glass plate 11 so as to prevent the feeding electrode 50 from extending into the lower side heating area 24. This arrangement advantageously allows frost, snow, ice or the like adhering to the laminated plate 14 to be melted, with the result that a driver's field of view is not hindered and that the movement of a wiper is not adversely affected.

The positive electrode 51 and the negative electrode 52 of the feeding electrode are disposed by printing or applying, e.g. conductive silver paste on the vehicle interior side surface of the vehicle exterior side glass plate 11. As a result, a part of the glass plate where the conductive silver paste is applied is adversely affected by heat reflection of the silver during forming the glass plate (e.g. bending the glass plate) to have a lower temperature than a part of the glass plate where no conductive silver paste is applied, with the result that a temperature difference could generate between both parts to cause failure in forming the glass plate.

Since the feeding electrode 50 according to this embodiment allows the areas of the positive electrode 51 and the negative electrode 52 to be reduced in comparison with the conventional feeding electrode, a temperature difference by heat reflection of the silver is less liable to be generated between both parts to cause failure in forming the glass plate, with the result that the present invention is preferred for forming a glass plate.

The feeding electrode 50 is disposed so as to be exposed in the cutout portion 53. When the feeding electrode 50 is entirely exposed in the cutout portion, the lower side heating wire 21, the first wire for the lateral side heating wire 32 and the second wire for the lateral side heating wire 33 could be broken in a step for laminating the laminated glass 14 because of having a thin conductor width. From this point of view, at least a part of the feeding electrode 50 is preferred to be disposed without being exposed in the cutout portion 53. In this case, the feeding electrode 50 is preferred to be disposed so as to extend into an inner area of the laminated glass 14 by about 2 mm to about 5 mm from an edge of the cutout portion 53.

In the conductor pattern of the window glass for a vehicle according to the embodiment shown in FIG. 3, a part of the first wire for the lateral side heating wire 32, which extends in parallel to the lower side heating wire 21, has the same heat generation capacity per unit length as a single conductor of the lower side heating wire 21 including a plurality of conductors, or a heat generation capacity per unit length enough to generate heat so as to melt frost, snow, ice or the like adhering to the laminated glass 14. By this arrangement, the lower side heating area 24 is heated by lower side heating wire 21 and the part of the first wire for the lateral side heating wire 32, which extends in parallel to the lower side heating wire 21. The remaining part of the first wire for the lateral side heating wire 32, which does not extend in parallel to the lower side heating wire 21, may be subjected to adjustment, such as an increase in the number of the conductors or the conductor width, for the purpose of securing a voltage required for causing the lateral side heating wire 31 to generate heat at a target temperature. The second wire for the lateral side heating wire 33 has no purpose for generating heat, being different from the lower side heating wire 21, the lateral side heating wire 31, and the part of the first wire for the lateral side heating wire 32, which extends in parallel to the lower side heating wire 21. For this reason, the second wire for the lateral side heating wire may be subjected to adjustment, such as an increase in the number of the conductors or the width of the conductors, for the purpose of securing a voltage required for causing the lateral side heating wire 31 to generate heat at a target temperature. It should be noted that the feeding electrode 50 and a part of the second wire for the lateral side heating wire 33, which branches out into a plurality of conductors, or which has a width increased, may also have the same heat generation capacity per unit length as the part of the first wire for the lateral side heating wire 32, which extends in parallel to the lower side heating wire 21.

As shown in FIG. 4, in the conventional conductor pattern for a vehicle window, a first wire for a lateral side heating wire 132 and a second wire for a lateral side heating wire 133, which feed power to a lateral side heating wire 131 corresponding to a lateral side heating area 134, have lowered a heat generation capacity by being subjected to adjustment, such as an increase in the number of the conductors or the conductor width, for the purpose of securing a voltage required for causing the lateral side heating wire 131 to generate heat at a target temperature. For this reason, the first wire for a lateral side heating wire 132 and the second wire for a lateral side heating wire 133 do not have a heat generation capacity per unit length enough to melt frost, snow, ice or the like adhering to laminated plate 14.

Recently, it is demanded that the wiper standby positions 41a and 41b be set at a position of the laminated glass 14 closer to the lower side from the viewpoint of improved vehicle design. In the conventional conductor pattern for a vehicle window, the first wire for a lateral side heating wire 132 and the second wire for a lateral side heating wire 133 are disposed below a lower side heating wire 121, with the result that the lower side heating wire 121 is disposed in a position closer to an upper side with respect to the lower side edge 18 of a vehicle exterior side glass plate 11. As a result, it is difficult to set the wiper standby positions 41a and 41b at a position of the laminated glass 14 closer to the lower side.

In contrast, the conductor pattern for a vehicle window according to the embodiment allows the wiper standby positions 41a and 41b to be set at a position closer to the lower side of the laminated glass 14 than the conventional conductor pattern for a vehicle window since the lower side heating area 24 is heated by the lower side heating wire 21 and the first wire for the lateral side heating wire 32.

Figure 5:
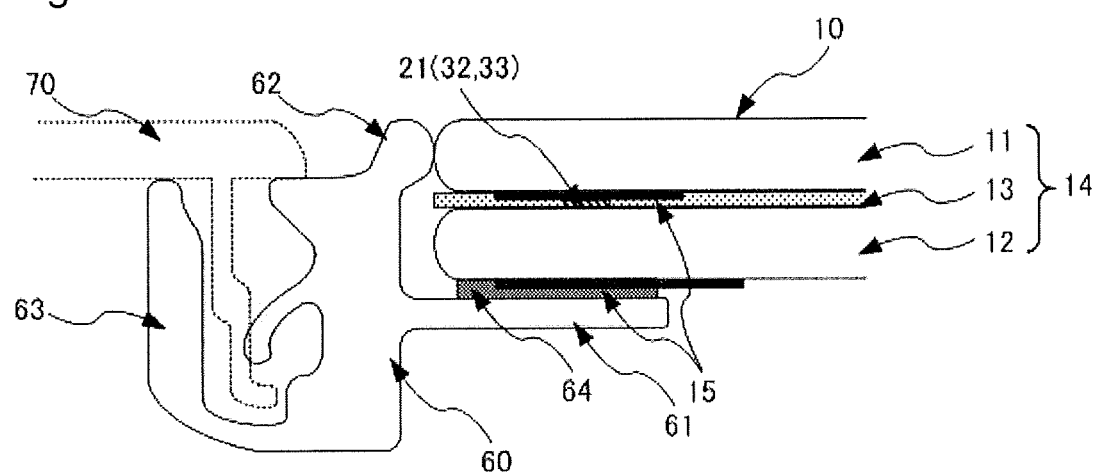
FIG. 5 is a cross-sectional view of essential parts of the lower side area of window glass for a vehicle with the window glass according to the embodiment being mounted to the vehicle.

FIG. 5 is a cross-sectional view of essential parts of the lower side area of the window glass for a vehicle 10 with the window glass for a vehicle 10 according to the embodiment being mounted to the vehicle.

As shown in FIG. 5, a sealing member 60 is an elongated member, which extends in right and left directions or a width direction of the window glass for a vehicle 10. The sealing member 60 includes an upper plate 61 to be bonded to a lower edge of the vehicle interior side of the vehicle interior side glass plate 12 by an adhesive layer 64, a lip part 62 projecting toward the vehicle exterior side and having a leading edge interposed between a lower edge face of the vehicle exterior side glass plate 11 and an upper edge face of a cowl top 70, and a hook part 63 extending downward so as to be curved to have a convex vehicle interior side surface and opening toward the vehicle exterior side.

The cowl top 70 is a lid for closing an upper opening of a cowl box (not shown). The cowl top 70 has a rib formed in an arrowhead shape so as to project toward a vehicle interior side and to be engaged with the hook part 63 of the sealing member 60.

In the embodiment, the sealing member 60 is configured such that the lip part 62 has a face exposed on the vehicle exterior side so as to be substantially flush with the lower edge face of the vehicle exterior side glass plate 11 and the top end face of the cowl top 70. It should be noted that the wording "substantially flush with" means not only that the face exposed on the vehicle exterior side shares a complete common plane (or is flush) with the lower edge face of the vehicle exterior side glass plate 11 and the top end face of the cowl top 70 but also that the face exposed on the vehicle exterior side is out of alignment due to e.g. manufacturing error.

Recently, it has been demanded to reduce air resistance and achieve an improved design property by flush-surfacing (where a vehicle body surface and a window surface are flush with each other). Under the circumstance, the wiper standby positions 41a and 41b trend to be set at a position of the laminated glass closer to the lower side.

In the case of the conductor pattern for a vehicle window according to the embodiment, when the wiper standby positions 41a and 41b are set at a substantially central position of the lower side heating area 24 in a height direction thereof, it is possible to reduce the distance between the wiper standby positions 41a and 41b, and the lower side edge 18 of the vehicle exterior side glass plate 11 in comparison with the distance in the conventional conductor pattern for a vehicle window.

In other words, in the case of the conventional conductor pattern for a vehicle window, when the wiper standby positions 41a and 41b are set at a position of the laminated glass 14 closer to the lower side, the lower heating area 124 is shifted upward with respect to an area corresponding to the wiper standby positions 41a and 41b. When the lateral side heating wire 132 and the second wire for a lateral side heating wire 133 do not sufficiently generate heat, the deicing function is degraded.

In contrast, in the case of the conductor pattern for a vehicle window according to the embodiment, even when the wiper standby positions 41a and 41b are set at a position of the laminated glass 14 closer to the lower side, it is possible to set the wiper standby positions 41a and 41b at a position of the laminated glass 14 closer to the lower side without degrading the deicing function since the lower side heating area 24 is prevented from being shifted with respect to an area corresponding to the wiper standby positions 41a and 41b.

Although the present invention has been described in reference to the embodiment, it should be construed that the present invention is not limited to the embodiment. With regard to the structure and the details of the present invention, numerous modifications and changes can be made as being understood by a person skilled in the art without departing from the scope of the present invention.

INDUSTRIAL APPLICABILITY

The window glass with a sealing member according to the present invention is advantageously applicable not only to the opening of an automobile but also to any kinds of vehicles, such as an electric, diesel or diesel-electric locomotive, a railroad vehicle or a truck. Further, the window glass with a sealing member according to the present invention is not limited to the use in a vehicle but is advantageously applicable to an airplane or a ship.

The entire disclosure of Japanese Patent Application No. 2016-246441 filed on Dec. 20, 2016 including specification, claims, drawings and summary is incorporated herein by reference in its entirety.

What is claimed is:

1. Window glass for a vehicle, comprising:
laminated glass including a vehicle exterior side glass plate, a vehicle interior side glass plate and an interlayer interposed between the vehicle exterior side glass plate and the vehicle interior side glass plate; and
a conductor pattern including a heating wire disposed on a vehicle interior side surface of the vehicle exterior side glass plate to heat a heating area, and a feeding electrode disposed on a part of the vehicle interior side surface close to a lower side of the vehicle exterior side glass plate such that the heating wire is fed with power through the feeding electrode;
wherein the heating area includes a lower side heating area disposed in an area along a lower side of the laminated glass, and a lateral side heating area disposed along at least one of lateral sides of the laminated glass: and
the feeding electrode is disposed so as not to extend into a lower side heating area
wherein the heating wire comprises a lower side heating wire corresponding to the lower side heating area, and a lateral side heating wire corresponding to the lateral side heating area: and
the lateral side heating wire comprises a first wire for the lateral side heating wire disposed between the lower side heating wire and a lower side edge of the laminated glass, and a second wire for the lateral side heating wire disposed closer to an upper side of the laminated glass than the lower side heating wire: and
wherein the lower side heating area is an area to be heated by the lower side heating wire and a part of the first wire for the lateral side heating wire extending in parallel to the lower side heating wire.

2. The window glass for a vehicle according to claim 1, wherein the laminated glass comprises an exterior side surface including a first wiper wiping range to be wiped by a first wiper, and a second wiper wiping range to be wiped by a second wiper;
the lateral side heating area comprises an area corresponding to a moving direction reversing position of the second wiper; and
the lower side heating area comprises an area corresponding to a standby position of the first wiper and a standby position of the second wiper.

3. The window glass for a vehicle according to claim 1, wherein the vehicle interior side glass plate has a cutout portion formed therein so as to expose the feeding electrode disposed on a part of the vehicle interior side surface close to the lower side of the vehicle exterior side glass plate.

4. The window glass for a vehicle according to claim 1, wherein the feeding electrode comprises a positive electrode and a negative electrode, which are connected to the heating wires.

5. The window glass for a vehicle according to claim 1, wherein the conductor pattern comprises a deicer, which serves to melt frost, ice or snow adhering to the laminated glass.

6. The window glass for a vehicle according to claim 1, wherein the conductor pattern is disposed in an overlapping range with a shielding layer disposed on a peripheral area of the laminated glass.

7. The window glass for a vehicle according to claim 1, wherein the heating wire is made of a material having a resistivity of $0.5\times10^{-8}$ Ω·m to $9.0\times10^{-8}$ Ω·m.

8. The window glass for a vehicle according to claim 1, wherein the laminated glass has a sealing member in a lower side edge area;
the sealing member comprises an upper plate to be bonded to a lower edge of a vehicle interior side surface of the vehicle interior side glass plate, a lip part projecting toward a vehicle exterior side and having a leading edge interposed between a lower edge surface of the laminated glass and an upper edge surface of a cowl top, and a hook part extending downward so as to be curved to have a convex vehicle interior side surface and opening toward the vehicle exterior side; and
the lip part having a surface exposed on the vehicle exterior side and substantially flush with the upper edge surface of the cowl top.

9. The window glass for a vehicle according to claim 1, wherein the conductor pattern is disposed on the vehicle interior side surface of the vehicle exterior side glass plate.

10. The window glass for a vehicle according to claim 1, wherein a part of the first wire for the lateral side heating wire, which does not extend in parallel to the lower side heating wire, is configured to have an increased number of conductors or an increased conductor width in comparison with a part of the first wire for the lateral side heating wire, which extends in parallel to the lower side heating wire.

11. The window glass for a vehicle according to claim 1, wherein the second wire for the lateral side heating wire is configured to have an increased number of conductors or an increased conductor width in comparison with the lower side heating wire, a part of the first wire for the lateral side heating wire, which extends in parallel to the lower side heating wire, and the lateral side heating wire.

12. The window glass for a vehicle according to claim 1, wherein the feeding electrode is disposed so as to extend into an inner area of the laminated glass by about 2 mm to about 5 mm from an edge of the cutout portion.

* * * * *